United States Patent

[11] 3,598,149

| [72] | Inventor | Donald E. Witkin |
| | | Warren, Pa. |
| [21] | Appl. No. | 847,168 |
| [22] | Filed | Aug. 4, 1969 |
| [45] | Patented | Aug. 10, 1971 |
| [73] | Assignee | National Forge Company |
| | | Irvine, Pa. |

[54] HIGH-PRESSURE METERING VALVE
6 Claims, 2 Drawing Figs.

[52] U.S. Cl. .................................................. 137/599,
138/46
[51] Int. Cl. ............................................. F15d 1/00
[50] Field of Search .................................... 137/599,
608, 625.3; 251/120, 121; 138/46, 45

[56] References Cited

UNITED STATES PATENTS

| 1,510,802 | 10/1924 | Scott .......................... | 251/121 |
| 2,282,675 | 5/1942 | Rigott .......................... | 138/46 |
| 2,344,943 | 3/1944 | Gorden ........................ | 138/45 |
| 2,531,479 | 11/1950 | Southern ..................... | 251/120 X |
| 3,135,994 | 6/1964 | Skinner ....................... | 138/45 X |

FOREIGN PATENTS

| 694,416 | 7/1953 | Great Britain ................ | 137/599 |

*Primary Examiner*—Alan Cohan
*Attorney*—Charles B. Smith

ABSTRACT: A high-pressure, restriction-flow-metering valve in which a control rod is longitudinally inserted in a hollow cylinder of slightly larger internal diameter having exhaust ports at either end and a high-pressure input port intermediate the cylinder ends.

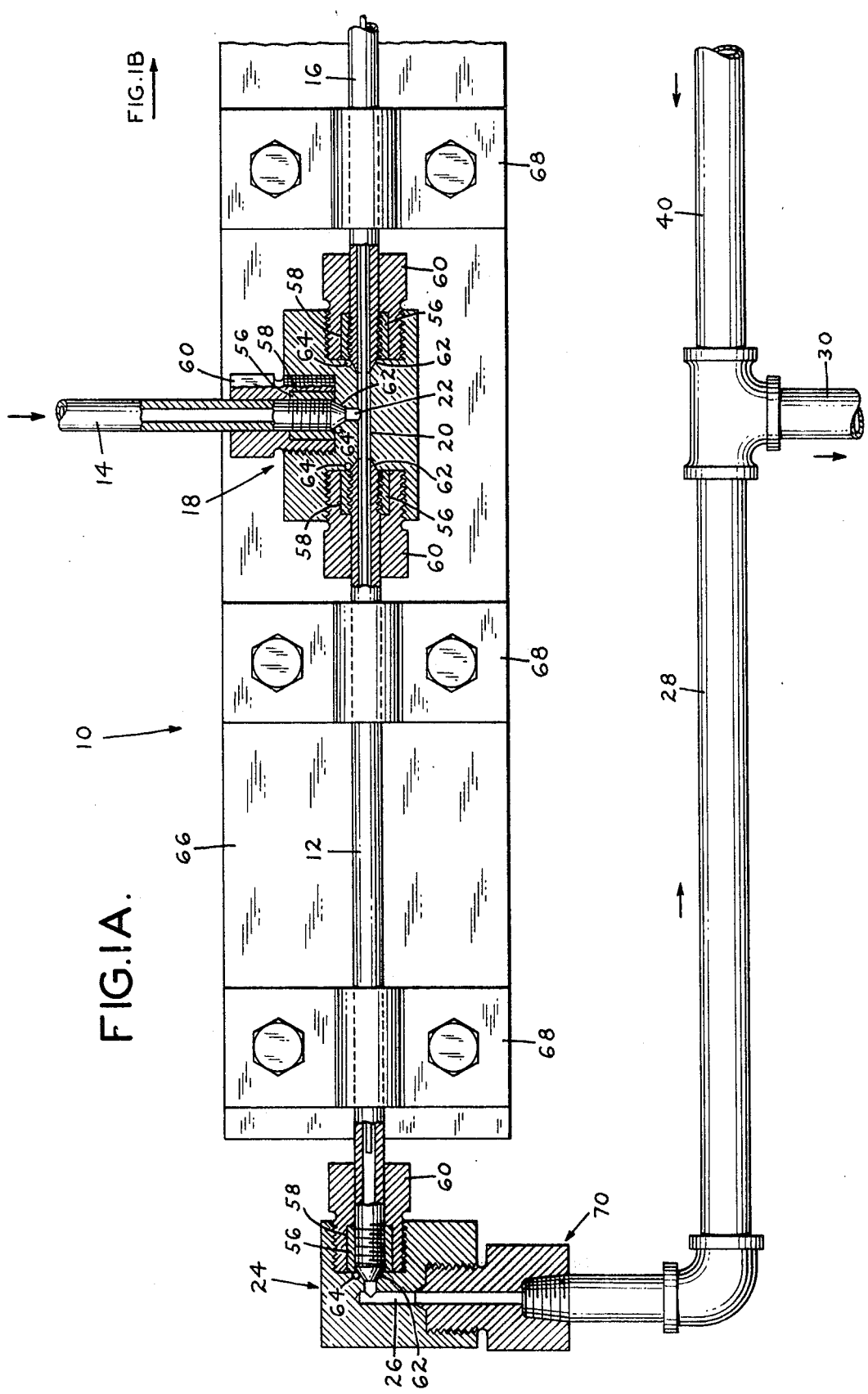

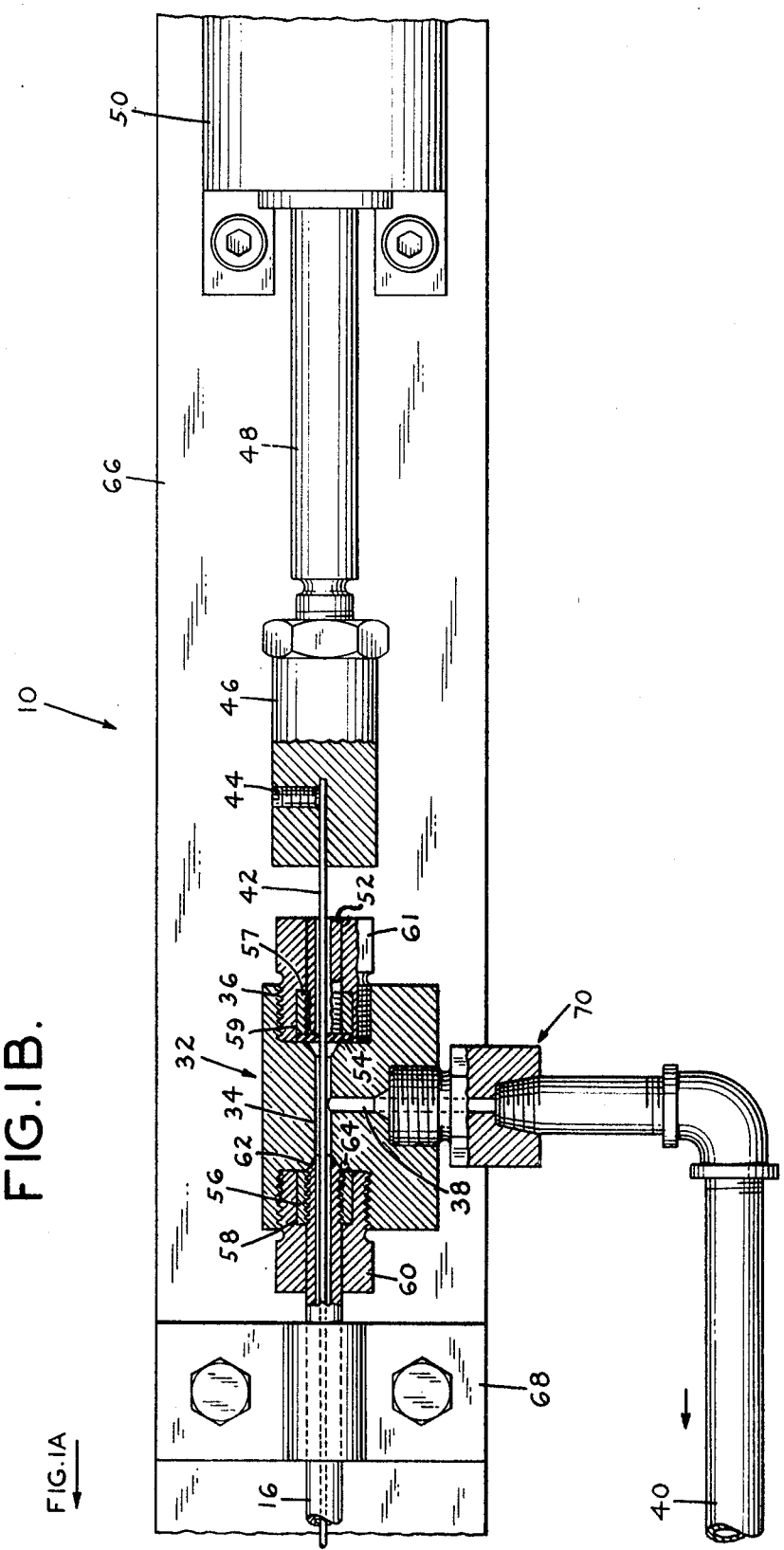

HIGH-PRESSURE METERING VALVE

BACKGROUND OF THE INVENTION

The present invention relates to high-pressure metering valves and more particularly to high-pressure, restriction flow valves in which a control rod is slidably fitted within a cylinder having a bore slightly larger than the diameter of the rod so as to form an annular restriction for fluids passing through the cylinder.

Conventional valves, such as the needle type, are subject to severe wire drawing and erosion of their stems and seats when subjected to high-pressure drops. This is due to the extremely high velocities which exist and the extremely small orifices and short paths across which the high-pressure drop occurs. The result is a short useful valve life, especially when attempting to control against a variable pressure. A restriction flow valve is not subject to these deficiencies since the required pressure drop per unit length of the annular passage is much less than exists in conventional needle valves.

Many conventional restriction flow valves are limited to use in low-pressure operations such as metering lubricant flow to bearings or fuel to the engine. Such valves have an input port at one end of the cylinder and exhaust port at the other. The control rod may be fitted with a gasket at the point where it is withdrawn from cylinder to prevent escape of the fluid.

When a source of fluid under high pressure is applied to the input port of such a conventional restriction flow valve, an axial force is exerted either on the end of the control rod, if the rod is being withdrawn from the low-pressure end of the cylinder, or on the gasket, if the rod is being withdrawn from the high-pressure end of the cylinder. In the latter case, it is difficult to design and manufacture a gasket and packing which will withstand such high pressures, particularly when the valve is small. In the former case, this axial force will buckle the rod unless it is made sufficiently strong. This necessitates a rod having a large diameter relative to its length, a requirement inconsistent with the design of small metering valves. In addition, the actuating mechanism for the control rod must be capable of withstanding this outward axial force.

The present invention overcomes these problems by providing a cylinder having a high-pressure input at a point between the cylinder ends. Any forces exerted on the rod are balanced and the rod gasket is at the low-pressure end of the cylinder where the gasket-packing problems are negligible. Thus the control rod need not be designed for compressive loads and may be made extremely thin for use in very small high-pressure valves. The absence of axial pressure forces on the rod also simplifies the design of a practical actuator for the control rod in such small valves.

SUMMARY OF THE INVENTION

The invention comprises a metering valve including a hollow cylinder having output ports at both ends, an input port intermediate the cylinder ends and having an internal diameter which is substantially uniform between the output ports. A control rod having a substantially uniform diameter which is slightly smaller than the internal diameter of the cylinder is partially inserted in the cylinder, longitudinally.

BRIEF DESCRIPTION OF THE DRAWING

FIGS. 1A and 1B, when joined together as indicated, form a side elevational view, partially in section, of a preferred embodiment of the present invention.

DESCRIPTION OF THE PREFERRED EMBODIMENTS

Referring now to FIGS. 1A and 1B, a preferred embodiment of the invention comprises a cylinder assembly 10 including three hollow tube members 12, 14, 16, each having an end joined to a tee member 18. The tubes 12 and 16 are at 180° to each other and the tube 14 is at 90° to both of the other tubes 12, 16. A straight bore 20 in the tee member 18 provides a fluid passage from the end of the tube 16 to the end of the tube 12. The longitudinal axes of the bore 20 and the tubes 12, 16 form a straight line. A bore 22 in the tee member 18 joins the bore 20 at right angles and provides a fluid passage from the end of the tube 14 to the bore 20 and thus to the ends of the tubes 12, 16.

The other end of the tube 12 is connected to an ell member 24. A pipe 28 is connected at one end to the ell member 24 and at the other end to an exhaust port 30. A bore 26, in the ell member 24, provides a fluid passage between the end of the tube 12 and the end of the pipe 28 connected to the ell member 24.

The other end of the tube 16 is connected to a tee member 32. A straight bore 34 extends completely through the tee member 32 to provide a fluid passage between the end of the tube 16 and an opening 36, in the tee member 32, directly opposite the end of the tube 16. The longitudinal axis of the bore 34 is aligned with the longitudinal axes of the tubes 12, 16 and the bore 20 in the tee member 18 such that all the axes form a straight line. The continuous fluid passage provided by the bore 34, the tube 16, the bore 20, and the tube 12 has an internal diameter which is substantially uniform throughout its length.

A pipe 40 is connected at one end to the tee member 32 and at the other end to the exhaust port 30. A bore 38, in the tee member 32, joins the bore 34 at right angles and provides a fluid passage to the end of the pipe 40.

The ends of the tubes 12, 14, and 16 are coned and are provided with left-hand threaded collars 56. The collars 56 are slidably received within bores 58 in gland nuts 60. The gland nuts 60 are right-hand threaded into the respective tee and ell members. The gland nuts 60 bear against the collars 56 to force the ends of tubes 12, 14, 16 into conical seats 62 in the respective tee and ell members, making nearly fluidtight seals. The tee and ell members have bores 64 (shown in the drawing as directed into the page) leading from the outermost edge of the conical seats 62 to the exterior surfaces of the members to insure that fluid leaking past the conical ends of the tubes 12, 14, 16 does not exert an axial force on the collars 56 and gland nuts 60. The pipes 28, 40 are connected to the respective members 24, 32 by threadably fitted adapters 70.

A control rod 42 having a substantially uniform diameter throughout its length which is slightly smaller than the internal diameters of the bores 20 and 34 and the hollow tubes 12 and 16 is mounted at one end in a anchor member 46 by means of a setscrew 44. The anchor member 46 is mounted on the end of a piston rod 48 slidably fitted within an air cylinder 50. The axial position of the rod 42 may be controlled by varying the air pressure within the cylinder 50.

The control rod 42 is longitudinally fitted through a tube 52, rubber wiper 54, and the bore 34 in the tee member 32. The rubber wiper 54 fits snugly around the control rod 42. The tube 52 is of the same construction as the tubes 12, 14 and 16 but it is used only to support and position the control rod 42. One end of the tube 52 is provided with a left-hand threaded collar 57 which is slidably received within a bore 59 in a gland nut 61. The tube 52 is approximately the same length as the gland nut 61. The gland nut 61 is threadably received in the opening 36 in the tee member 32 and together with the rubber wiper 54, positioned in the opening 36, forms a seal to prevent the escape of fluid from the tee member 32.

The control rod 42 may be longitudinally inserted through the combined lengths of the tube 52, the bore 34, the tube 16, the bore 20, and the tube 12, or positioned at any intermediate length. The elongated annular restriction thus provided between the inserted portion of the rod 42 and the walls of the bore 34, the hollow tube 16, The bore 20 and the hollow tube 12 distributes the pressure drop across the length of the valve such that no extremely small orifices or short paths exist to promote erosion of the valve when high-velocity fluids pass through it. When the control rod 42 is fully inserted the annular restrictions in the tube members 12, 16 are at their greatest, and the rate of fluid flow through the tube members 12, 16 is at a minumum. If the control rod 42 is fully withdrawn, the rate of fluid flow is at a maximum. In the preferred embodiment, the position of the control rod 42 is varied between complete insertion and a position of withdrawal such that the end of the control rod 42 lies at the junction of the bores 20 and 22.

In operation, the other end of the tube member 14 is connected to a vessel containing fluid under high pressure (not shown). As fluid flows through the valve assembly 10, the pressure in the vessel falls, the pressure drop across the metering valve decreases, and the flow through the valve will decrease. Thus the rate of pressure decay in the pressure vessel will decrease. In a preferred embodiment the control rod 42 is slowly withdrawn so that the length of the annular fluid restriction in the tube member 12 is decreased. With the decrease in the length of the annular restriction, the flow in the tube member 12 is increased to sustain the imposed pressure drop across the valve assembly 10. The rod 42 is withdrawn at the proper rate to maintain a constant rate of pressure decay in the vessel.

The tube assembly 10 is mounted on a rigid member 66 by means of brackets 68 which are fitted around the tubes 12, and 16. The air cylinder 50 is also mounted to the rigid member 66.

In other embodiments of the invention, the control rod 42 and the tubes 12, 16 are made of a material which has compressive and tensile strength but which is flexible. In one such embodiment the material used is stainless steel. In these embodiments, the longitudinal axes of the tubes 12, 16, bores 20, 34, and the control rod 42 do not necessarily form a straight line but may form a curved line to suit particular constructional arrangements of the valve. In some embodiments, the axis of the control rod 42 and the axes of the tubes 12, 16, and the bores 20, 34 are not coaxial, though the rod lies within the respective tubes and bores.

In still other embodiments the cylinder assembly 10 is cast as a single member and the fluid passages are machine bored.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention.

What I claim is:

1. A flow-metering valve, comprising an elongated hollow tubular member having spaced outlet ports defining therebetween a continuous, elongated fluid passage, said member having an inlet port communicating with said fluid passage at a point intermediate said outlet ports, an elongated control rod, means to mount said control rod in said passage for longitudinal movement along said passage, said control rod having a diameter less than that of said passage and substantially uniform throughout the length of said control rod to permit fluid flow along said passage around said control rod, and externally controllable means for moving said control rod longitudinally of said passage thereby to vary the ratio of fluid flow resistance in said passage between said inlet port and said respective outlet ports.

2. A flow-metering valve as set forth in claim 1 in which said control rod has one end located outside of said tubular member and the other end located within said passage.

3. A flow-metering valve as set forth in claim 1 in which said control rod is movable between a first position in which said control rod extends substantially throughout the length of said fluid passage between said outlet ports and a second position in which said control rod is out of that portion of said fluid passage extending between one of said outlet ports and said intermediate point.

4. A high-pressure flow-metering valve, comprising an elongated hollow tubular member having spaced outlet ports adjacent opposite ends thereof and an inlet port communicating with the interior of said member at an intermediate point, said tubular member having an internal diameter which is substantially uniform throughout its length between said outlet ports, an elongated control rod having a diameter less than that of said tubular member and substantially uniform throughout the length of said control rod, means to mount said control rod for movement longitudinally of said tubular member, one end of said control rod being located within said tubular member and the other end of said control rod being located externally of said tubular member, said control rod being movable between a first position in which said control rod extends through said tubular member substantially spanning the distance between said outlet ports and a second position in which said tubular member spans within said tubular member substantially only the distance between said intermediate point and one of said outlet ports, and externally controllable means for moving said control rod between said positions thereof thereby to vary the ratio of fluid flow resistance between said inlet port and said respective outlet ports.

5. A high-pressure flow-metering valve as recited in claim 4 comprising an elongated hollow tubular member having spaced outlet ports adjacent opposite ends thereof and an inlet port communicating with the interior of said member at a point substantially equidistant from the outlet ports.

6. A high-pressure flow-metering valve as recited in claim 4 wherein said externally controllable means comprises means for moving said control rod between said positions at a predetermined rate of withdrawal to maintain a substantially constant rate of decay of the pressure drop across the metering valve.